United States Patent [19]

Chiao

[11] Patent Number: 4,828,585
[45] Date of Patent: May 9, 1989

[54] SURFACE MODIFIED GAS SEPARATION MEMBRANES

[75] Inventor: Cherry C. Chiao, Danville, Calif.

[73] Assignee: The Dow Chemical Company, Midland, Mich.

[21] Appl. No.: 142,890

[22] Filed: Jan. 11, 1988

Related U.S. Application Data

[63] Continuation of Ser. No. 893,078, Aug. 1, 1986, abandoned.

[51] Int. Cl.⁴ .............................................. B01D 53/22
[52] U.S. Cl. .......................................... 55/16; 55/68; 55/158
[58] Field of Search ...................... 55/16, 68, 158, 524; 428/393, 394, 412, 224, 442; 521/27; 525/344, 356; 427/248.1

[56] References Cited

U.S. PATENT DOCUMENTS

| | | | |
|---|---|---|---|
| 2,497,046 | 2/1950 | Kropa | 260/92.1 |
| 2,811,468 | 10/1957 | Joffre et al. | 117/95 |
| 2,829,070 | 4/1958 | Osborn | 117/93 |
| 3,062,905 | 5/1958 | Jennings et al. | 260/674 |
| 3,246,449 | 4/1966 | Stern et al. | 55/16 |
| 3,266,223 | 8/1966 | Dresser et al. | 55/158 |
| 3,413,266 | 11/1968 | Saines et al. | 260/47 |
| 3,647,613 | 3/1972 | Scotland | 161/165 |
| 3,758,450 | 9/1973 | Margrave et al. | 525/356 |
| 3,780,496 | 12/1973 | Ward III et al. | 55/16 |
| 3,862,284 | 1/1975 | Dixon et al. | 264/83 |
| 4,020,223 | 4/1977 | Dixon et al. | 428/244 |
| 4,076,916 | 2/1978 | Lagow | 526/43 |
| 4,086,310 | 4/1978 | Bottenbruch et al. | 55/158 X |
| 4,144,374 | 3/1979 | Lagow et al. | 525/356 X |
| 4,188,469 | 2/1980 | Fang | 525/344 X |
| 4,210,529 | 7/1980 | Petersen | 55/16 X |
| 4,296,151 | 10/1981 | Boultinghouse | 427/255.1 |
| 4,404,256 | 9/1983 | Anand et al. | 525/356 X |
| 4,467,075 | 8/1984 | Tarancon | 525/356 |
| 4,472,175 | 9/1984 | Malon et al. | 55/16 |
| 4,484,954 | 11/1984 | Tarancon | 148/6.3 |
| 4,486,202 | 12/1984 | Malon et al. | 55/158 |
| 4,491,653 | 1/1985 | McGinniss et al. | 525/356 |
| 4,515,761 | 5/1985 | Plotzker | 423/240 |
| 4,522,952 | 6/1985 | Klein et al. | 525/356 X |
| 4,549,012 | 10/1985 | Sharma | 536/82 |
| 4,593,050 | 6/1986 | Cohen et al. | 525/356 X |
| 4,656,564 | 4/1987 | Langsam | 55/16 |

FOREIGN PATENT DOCUMENTS

| | | |
|---|---|---|
| 146020 | 6/1985 | European Pat. Off. . |
| 266698 | 5/1988 | European Pat. Off. . |
| 3023455 | 1/1982 | Fed. Rep. of Germany ...... 525/356 |
| 788 | 1/1977 | Japan ..................... 55/16 |
| 52-000788 | 1/1977 | Japan . |
| 5121 | 1/1981 | Japan ..................... 55/16 |
| 57-25409 | 2/1982 | Japan . |
| 59-189913 | 10/1984 | Japan . |
| 59-206006 | 11/1984 | Japan . |
| 60-86132 | 5/1985 | Japan . |

Primary Examiner—Robert Spitzer

[57] ABSTRACT

A method of using an improved membrane to separate gases is described. The membrane is surface treated by exposing at least one surface of a semipermeable membrane to gaseous fluorine or a combination of gaseous fluorine and sulfur dioxide. The modified membrane contains fluorine or fluorine and sulfur oxide functionalities at the membrane surface, thereby enhancing the gas separation properties of the membrane. The membrane may be used to separate gas mixtures such as carbon dioxide and methane, oxygen and nitrogen, or nitrogen and methane.

8 Claims, No Drawings

SURFACE MODIFIED GAS SEPARATION MEMBRANES

Cross Reference to Related Application

This is a continuation of application Ser. No. 893,078 filed Aug. 1, 1986, now abandoned.

BACKGROUND OF THE INVENTION

This invention relates to a method of using an improved membrane to separate gas mixtures. In particular, this invention pertains to the use of a modified membrane containing fluorine or fluorine and sulfur oxide functionalities at the membrane surface which improves the gas separation properties over the unmodified membrane.

The use of membranes to separate gases is well known in the art. Gas separation membranes have been fabricated from a wide variety of polymers and incorporated into different device configurations. Such membrane devices have been used to separate oxygen, nitrogen, carbon dioxide, methane, hydrogen, and other gases from gas mixtures.

An ideal gas separation membrane possesses a high separation factor (selectivity), high gas permeability, good temperature and chemical resistance, and good mechanical strength. Polymeric materials possessing high selectivities generally have undesirably low permeabilities. Those polymers having high permeability values usually generate unacceptably low separation factors. A choice between a high gas permeability and a high separation factor has been required.

Fluoropolymer membranes have attractive gas separation factors and good chemical and temperature resistance but low, commercially uneconomical gas fluxes for several gas separations of interest. A membrane which overcomes the necessity of choosing between a high selectivity and a high gas flux has long been sought.

Surface treatment of the membrane provides one possible way to obtain high selectivity and flux combinations. Fluorination of polymers with pendant ester, carboxylic acid, acid halide, or acid anhydride groups by gaseous exposure is described in U.S. Pat. No. 4,076,916. However, the treatment method described uses disadvantageously long exposure times (days) and high $F_2$ concentrations which may cause degradation. Surface halogenation treatment techniques have also been applied to polyolefin films used to separate liquid organic chemicals such as naphthenes and paraffins. See U.S. Pat. No. 3,062,905. The surface of the polyolefin film is often heated to increase the halogenation reaction rate. In this case, the polyolefin film is generally first irradiated to promote crosslinking to increase temperature stability prior to gaseous exposure to produce good results. The problems with these techniques include long treatment times, high treatment temperatures, or irradiation in order to achieve an adequate degree of surface halogenation. Furthermore, under these conditions, degradation of the films may result.

Membranes heretofore fabricated from polymers with high selectivities possessed low gas fluxes because the membranes could not be made sufficiently thin. The need for a gas separation membrane with both high separation factor and high flux has not been met by the present art.

SUMMARY OF THE INVENTION

The present invention relates to a surface modified membrane for gas separation. The gas separation membrane comprises a semipermeable membrane which contains on at least one surface fluorine or fluorine and sulfur oxide functionalities. The membrane is produced by exposing at least one surface of the membrane to gaseous fluorine or a combination of gaseous fluorine and sulfur dioxide for a relatively short period of time and then recovering the treated membrane.

The advantage provided by the invention is a gas separation membrane with an extremely thin discriminating layer, which results in improved gas flux rates while maintaining high separation factors.

DETAILED DESCRIPTION OF THE INVENTION

Semipermeable membranes from a variety of polymers may be surface treated by fluorination or fluorination combined with sulfonation to improve gas separation properties. Selection criteria include gas selectivity, gas permeability, chemical resistance, temperature resistance, and mechanical strength. Gas permeability is defined as $$P = \frac{(\text{amount of permeant})(\text{membrane thickness})}{(\text{area})(\text{time})(\text{driving force gradient across the membrane})}.$$

A standard permeability measurement unit is $$\frac{cm^3 \text{ (STP) cm}}{cm^2 \text{ s cmHg}}$$

The separation factor (selectivity) is the ratio of the permeability of the faster permeating gas to the permeability of the slower permeating gas.

Since surface treatment results in improved selectivities with little or no reduction in gas permeabilities, the membrane to be modified should be selected for good mechanical strength and moderate to high gas permeability rates. The literature contains extensive listings of polymer materials suitable for membranes. See *The Polymer Handbook*, J. Brandrup and E. H. Immergut, editors, 2nd edition, John Wiley & Sons, New York, 1975. Preferred membrane materials for fluorination or fluorine/sulfonation surface-treatment include polyethersulfones, polysulfones, polystyrenes, polyarylates, polyesters, polycarbonates, ethyl cellulose, styrene-acrylonitrile copolymers (for example, TYRIL*, styrene-acrylonitrile resin, trademark of Dow Chemical Company), poly(4-vinylanisole-4-vinylpyridine), and acrylonitrile-butadience-styrene (ABS) terpolymers. More preferred membrane materials include polyethersulfones and polyarylates.

The membrane may be formed by a number of methods known in the art, such as solution casting, compression molding, and extrusion. Homogeneous, asymmetric, or composite membranes may be surface treated by the inventive process disclosed herein. See U.S. Pat. Nos. 4,230,463 and 4,277,344.

The membrane is placed in a reactor and at least one side of the membrane is exposed to gaseous fluorine, or a combination of fluorine and sulfur dioxide. The gas mixture may be optionally diluted with an inert gas such as nitrogen or helium. The treatment process may be batch or continuous. A wide range of exposure times and concentrations is operable. Controllable parameters include treatment gas flowrate, gas composition, treatment time, and temperature. A variety of different combinations will produce acceptable results.

A wide range of temperatures may be used. The temperature should be sufficiently below the softening or melting point of the polymeric material used for the membrane so that the membrane is not adversely affected. The physical properties of some polymeric materials are adversely affected by subfreezing temperatures. Temperatures below the point where stress cracking substantially occurs under use condition should be avoided with such polymers. Because the reaction rate generally increases with temperature, temperature can be used to control the reaction rate. A temperature which does not adversely affect the membrane and where the surface treatment reaction occurs at a reasonable rate may be used. The lower temperature limit is preferably about 0 degrees C, more preferably about 15 degrees C, and most preferably about 20 degrees C. The upper temperature limit is preferably about 80 degrees C, more preferably about 50 degrees C, most preferably about 35 degrees C. Other temperatures are operable. Operating at ambient temperature conditions is often convenient.

Gas compositions may vary. Fluorine gas, in conjunction with an inert gas such as nitrogen or helium, may be used. Contaminants in the treatment gas should be removed or kept at a minimum. Use of other sources of fluorine such as $ClF_3$ or $BrF_3$ results in partially brominated or chlorinated films and may produce undesirable results. The concentration of reactive gas used is time and temperature dependent. Higher fluorine concentrations are generally preferred because shorter exposure times at room temperature are desirable. Fluorine concentrations of up to 100% are operable. Alternately, a combination of gaseous fluorine and sulfur dioxide may also be used. Sulfur dioxide concentrations up to more than 99% are operable. Gas mixtures of 4–50% fluorine and 50–99% sulfur dioxide, with an appropriate amount of inert dilutent gas are preferred. Gas mixtures of 4–30% fluorine and 70–99% sulfur dioxide, appropriately diluted are most preferred.

Treatment time may vary from fractions of a minute to hours. Particularly in a continuous treatment process, shorter times are preferred. The treatment time required will depend upon the concentration of the treatment gas mixture used. Lower concentrations will require longer exposure times. The treatment time for a given gas composition must be limited so that the surface reaction does not progress to such a depth as to adversely affect gas permeability.

The resulting membrane has at least one surface modified so that some of the hydrogens at the membrane surface have been replaced with fluorine. Preferably at least 1% of the hydrogen groups at the membrane surface have been replaced by fluorine. More preferably, at least 5% of the hydrogen groups existing at the treated membrane surface have been replaced by fluorine. The surface treatment most preferably results in at least 10% of the hydrogens at one membrane surface being replaced by fluorine groups. The surface treatment results in some increase in gas selectivity with little decrease in gas permeability. A 10% increase in gas selectivity is preferred, a 20% increase in gas selectivity is more preferred, and an increase of gas selectivity of at least 40% is most preferred.

The surface modified membrane can be used to separate gas mixtures into enriched and depleted streams. The surface modified membranes are incorporated into plate & frame, spiral, or hollow fiber devices. Methods of fabricating such devices are known in the art. See U.S. Pat. Nos. 3,228,876, 3,422,008, 3,872,014, 4,061,574, 4,235,723, 4,430,219, 4,315,819.

Separation of oxygen and nitrogen, carbon dioxide and methane, nitrogen and methane, and other gas mixtures can be achieved by using the invention described herein. The fabricated membrane device is placed in an appropriate pressure vessel so that two separate fluid zones are defined, one on each side of the membrane. The surface treated side of the membrane is contacted with the feed gas mixture under pressure, while a pressure differential is maintained across the membrane. A portion of the feed gas permeates through the membrane from the high pressure side of the membrane to the low pressure side of the membrane such that an enriched and a depleted stream is obtained. The permeated gas is then removed from the downstream side of the membrane. The separation preferably takes place at temperatures between about 0 degrees C and about 150 degrees C.

The treated membrane has a carbon dioxide permeability preferably of about $1.0 \times 10^{(-10)}$ cm$^3$ (STP) cm/(cm$^2$ s cmHg), more preferably of about $5.0 \times 10^{(-10)}$ cm$^3$(STP) cm/(cm$^2$ s cmHg). The treated membrane has a separation factor for carbon dioxide/methane preferably of about 10, more preferably of about 15. The treated membrane has an oxygen permeability preferably of about $0.5 \times 10^{(-10)}$ cm$^3$(STP) cm/(cm$^2$ s cmHg), more preferably of about $1.2 \times 10^{(-10)}$ cm$^3$(STP) cm/(cm$^2$ s cmHg). The treated membrane has a separation factor for oxygen/nitrogen preferably of about 3, more preferably of about 5.

The following examples are presented to illustrate the invention. Polymer solution percentages are by weight. Gas treatment composition percentages are by volume. The gas separation properties of the treated and untreated membranes are measured using a constant-volume variable-pressure gas permeation system. Literature sources describe the appropriate permeability measurement techniques and apparatus. See *Methods of Experimental Physics*, Vol. 16c, Academic Press, Inc., 1980, pp. 315-377 and Pye, Hoehn, and Panar, "Measurement of Gas Permeability of Polymers. I. Permeabilities in Constant Volume/Variable Pressure Apparatus", *Journal of Applied Polymer Science*, Vol. 20, 1976, pp. 1921-1931. The membrane sample size is 7.7 cm$^2$. Permeability values are determined at 25 degrees C and with a 257 cm Hg pressure differential across the membrane. Data are reported in Table I.

EXAMPLE 1

Dissolve polystyrene in methylethylketone to form a 20% solution. A film is then solution cast onto a glass plate using a 0.01" casting bar. The film is covered and the solvent allowed to evaporate overnight at room temperature in a hood. Release the film from the glass plate by submerging in water. The surface water is first removed from the film before drying the film overnight in a vacuum oven at 60 degrees C and at reduced pressure.

The dried film is surface treated by placing the film in a 3" diameter ×12" tubular reactor vessel. The film is exposed to a gas mixture of 10% $F_2$ in $N_2$ flowing at 30 sccm over the film surface for two hours at ambient temperature, followed by a rapid 100% $N_2$ purge.

Data are reported in Table I. A significant increase in carbon dioxide/methane separation factor is achieved with only a slight decrease in carbon dioxide permeability.

EXAMPLE 2

Polyethersulfone is dissolved in dimethyl formamide to form a 15% solution. A film is then solution cast with a 0.005" casting bar onto a glass plate. Cover the film and evaporate the solvent overnight at room temperature in a dry box under a slow continuous stream of nitrogen. The film is removed from the glass plate and then dried in a vacuum oven overnight at 60 degrees C and at reduced pressure.

Surface treat the dried film by placing the film in a 3" diameter ×12" tubular reactor vessel. Expose the film to a gas mixture of 10% $F_2$ in He flowing at 30 sccm over the film surface for six hours at ambient temperature, followed by a rapid 100% $N_2$ purge.

Data are reported in Table I. The separation factor for carbon dioxide/methane is substantially increased through application of the invention with only a slight change in the permeability value for carbon dioxide.

EXAMPLE 3

Ardel D-100* polyarylate resin (a trademark of Union Carbide) is dissolved in methylene chloride to form a 15% solution. Solution cast several films onto glass plates using a 0.01" casting bar. The solvent is evaporated from the covered films overnight at room temperature in a hood. The films are released from the glass plate by submerging in water. The surface water is first removed from the films before drying the films in a vacuum oven overnight at 60 degrees C and at reduced pressure.

The dried films are surface treated by placing the films in a 3" diameter ×12" tubular reactor vessel. The films are treated under a variety of conditions which are listed in Table II.

Significant improvements in separation factor can be achieved with short exposure times of only a few minutes. See Table I.

EXAMPLE 4

A 15% solution of ETHOCEL* ethyl cellulose resin, (a trademark of The Dow Chemical Company) dissolved in methylene chloride is prepared. Several films are then solution cast onto glass plates with a 0.01" casting bar. The solvent is evaporated from the covered films overnight at room temperature in a hood. The films are released from the glass plates by submerging in water. The surface water is first removed from the films before drying the films in a vacuum oven overnight at 60 degrees C and at reduced pressure.

Each dried film is surface treated by placing the film in a 3" diameter ×12" tubular reactor vessel. The films are exposed to different concentrations of $F_2$ gas diluted with an inert gas for different treatment times at ambient temperature, indicated in Table III.

EXAMPLE 5

TYRIL* styrene-acrylonitrile resin, (a trademark of The Dow Chemical Company) is dissolved in methylethylketone to form a 20% solution. A film is then solution cast with a 0.01" casting bar onto a glass plate. Cover the film and evaporate the solvent overnight at room temperature. The film is removed from the glass plate and then dried in a vacuum oven overnight at 60 degrees C and at reduced pressure.

Surface treat the dried film by placing the film in a 3" diameter ×12" tubular reactor vessel. Expose the film to a gas mixture of 10% $F_2$ in He flowing at 30 sccm over the film surface for six hours at ambient temperature, followed by a rapid 100% $N_2$ purge.

Data are reported in Table I. The separation factor for carbon dioxide/methane is substantially increased through application of the invention with only a slight change in the permeability value for carbon dioxide.

EXAMPLE 6

Dissolve ABS in methylethylketone to form a 20% solution. A film is then solution cast with a 0.015" casting bar onto a glass plate. Cover the film and evaporate the solvent overnight at room temperature. The film is removed from the glass plate and then dried in a vacuum oven overnight at 60 degrees C and at reduced pressure.

The dired film is surface treated by placing the film in a 3" diameter ×12" tubular reactor vessel. Expose the film to a gas mixture of 10% $F_2$ in He flowing at 30 sccm over the film surface for six hours at ambient temperature, followed by a rapid 100% $N_2$ purge.

The separation factor for carbon dioxide/methane is substantially increased through application of the invention, indicated in Table I.

EXAMPLE 7

Poly(4-vinylamisole-4-vinylpyridine) is dissolved in methylethylketone to form a 17% solution. A film is then solution cast with a 0.015" casting bar onto a glass plate. Cover the film and evaporate the solvent overnight at room temperature. The film is removed from the glass plate and then dried in a vacuum oven overnight at 60 degrees C and at reduced pressure.

Surface treat the dried film by placing the film in a 3" diameter ×12" tubular reactor vessel. The film is exposed to a gas mixture of 10% $F_2$ in He flowing at 30 sccm over the film surface for six hours at ambient temperature, followed by a rapid 100% $N_2$ purge.

Data are reported in Table I. The separation factor for carbon dioxide/methane is increased through application of the invention with only a slight change in the permeability value for carbon dioxide.

TABLE I

| Permeability $\times 10^{(-10)}$ Membrane | $\dfrac{cm^3 (STP) \, cm}{cm^2 \, s \, cmHg}$ | | | | Separation Factor | | |
| --- | --- | --- | --- | --- | --- | --- | --- |
| | $CO_2$ | $CH_4$ | $O_2$ | $N_2$ | $CO_2/CH_4$ | $N_2/CH_4$ | $O_2/N_2$ |
| Example 1 Polystyrene | | | | | | | |
| Untreated | 11 | 1.0 | — | 0.76 | 11 | 0.76 | — |
| Treated | 9.6 | 0.40 | — | 0.49 | 24 | 1.2 | — |
| Example 2 Polyethersulfone | | | | | | | |
| Untreated | 2.6 | 0.064 | — | 0.075 | 41 | 1.2 | — |
| Treated | 2.2 | 0.032 | — | 0.080 | 68 | 2.5 | — |
| Example 3 Ardel D-100* | | | | | | | |
| Untreated | 7.3 | 0.32 | 1.3 | 0.36 | 23 | 1.1 | 3.7 |
| Treated A | 6.3 | 0.20 | 1.3 | 0.23 | 32 | 1.2 | 5.5 |
| Treated B | 5.6 | 0.17 | 1.2 | 0.26 | 33 | 1.5 | 4.6 |
| Treated C | 4.8 | 0.073 | 1.1 | 0.18 | 66 | 2.5 | 6.1 |
| Treated D | 6.7 | 0.20 | 1.3 | 0.25 | 33 | 1.3 | 5.2 |
| Example 4 ETHOCEL* | | | | | | | |

TABLE I-continued

| | | | | | | | |
|---|---|---|---|---|---|---|---|
| Untreated | 76 | 7.3 | 13 | 3.5 | 10 | 0.5 | 3.7 |
| Treated A | 61 | 4.6 | 10 | 2.8 | 13 | 0.6 | 3.6 |
| Treated B | 42 | 2.0 | 7.8 | 2.0 | 21 | 1.0 | 3.9 |
| Treated C | 54 | 3.4 | 9.5 | 2.5 | 16 | 0.7 | 3.8 |
| Treated D | 46 | 2.7 | 9.0 | 2.6 | 17 | 1.0 | 3.5 |
| Treated E | 57 | 4.1 | 9.7 | 2.8 | 14 | 0.7 | 3.5 |
| Membrane | $CO_2$ | $CH_4$ | $O_2$ | $N_2$ | $CO_2/CH_4$ | $N_2/CH_4$ | $O_2/N_2$ |
| Example 5 TYRIL* | | | | | | | |
| Untreated | 4.7 | .20 | .98 | .15 | 24 | 0.75 | 6.5 |
| Treated | 3.8 | .13 | .87 | .13 | 29 | 1.0 | 6.7 |
| Example 6 ABS | | | | | | | |
| Untreated | 6.6 | .26 | 1.5 | .25 | 25 | .96 | 6.0 |
| Treated | 2.2 | .048 | .58 | .096 | 46 | 2.0 | 6.1 |
| Example 7 Poly(4-vinylanisol-4-vinyl-pyridine) | | | | | | | |
| Untreated | 11 | .41 | 1.6 | .31 | 27 | 0.74 | 5.1 |
| Treated | 10 | .32 | 1.5 | .34 | 31 | 1.1 | 4.4 |

TABLE II

Example 3
Ardel* Membranes

| Film | Concentration* $F_2$ (%) | Concentration* $SO_2$ (%) | Flow (sccm) | Time (min) |
|---|---|---|---|---|
| A | 4 | 0 | 104 | 60 |
| B | 100 | 0 | — | 60 |
| C | 2.6 | 32.5 | 154 | 60 |
| D | 7.5 | 92.5 | 100 | 7 |

*diluted with an inert gas

TABLE III

Example 4
ETHOCEL* Membranes

| Film | Concentration $F_2$ (%)* | Time (min) |
|---|---|---|
| A | 8 | 5 |
| B | 4 | 60 |
| C | 48 | 5 |
| D | 100 | 5 |
| E | 75 | 10 |

*diluted with an inert gas

What is claimed is:

1. A process of separating a gas mixture comprising the steps of:
   (a) using a membrane fabricated from a polymer selected from the group consisting of polysulfone, polyethersulfone, polystyrene, polyarylate, polycarbonate, ethyl cellulose, styrene-acrylonitrile copolymer, ABS, and poly(4-vinylanisole-4-vinyl-pyridine), in which the membrane is first formed by extruding, molding, or casting said polymer followed by surface treating the formed membrane by exposure to gaseous fluorine or a combination of gaseous fluorine and sulfur dioxide under conditions such that at least 10 percent of the hydrogen groups at only the membrane surface are replaced by fluorine, thereby minimizing the treatment depth at the membrane surface and resulting in an increase in the selectivity of the treated over the untreated membrane of at least about 10 percent with a minimal decrease in permeability of the treated over the untreated membrane, and contacting the treated side of the membrane with a feed gas mixture under pressure,
   (b) maintaining a pressure differential across the membrane such that a portion of the feed gas mixture permeates through the membrane from the high pressure side to the low pressure side of the membrane, and
   (c) removing the permeated gas from the low pressure side of the membrane.

2. The method of claim 1 wherein the feed gas contains one of the gases chosen from the group of oxygen, nitrogen, methane, or carbon dioxide.

3. The method of claim 1 wherein the membrane used is asymmetric or a composite.

4. The method of claim 1 wherein the membrane used is in hollow fiber form.

5. The method of claim 1 wherein the separation factor for carbon dioxide/methane is 10 or greater.

6. The method of claim 1 wherein the separation factor for oxygen/nitrogen is 3 or greater.

7. A process of separating a gas mixture comprising the steps of:
   a. using a membrane fabricated from a polymer selected from the group consisting of polysulfone, polyethersulfone, polystyrene, polyarylate, polycarbonate, ethyl cellulose, styrene-acrylonitrile copolymer, ABS, and poly(4-vinylanisole-4-vinyl-pyridine), in which the membrane is first formed by extruding, molding, or casting said polymer followed by surface treating the formed membrane by exposure to gaseous fluorine or a combination of gaseous fluorine and sulfur dioxide under conditions such that at least 10 percent of the hydrogen groups at only the membrane surface are replaced by fluorine, thereby minimizing the treatment depth at the membrane surface and resulting in an increase in the selectivity of the treated over the untreated membrane of at least about 10 percent with a minimal decrease in permeability of the treated over the untreated membrane by exposing the formed membrane to gaseous fluorine at a concentration of between about 4 to about 50 percent by volume at a temperature between about 15 to about 80 degrees Celsius for a treatment time of less than about 60 minutes, and contacting the treated side of the membrane with a feed gas mixture under pressure,
   b. maintaining a pressure differential across the membrane such that a portion of the feed gas mixture permeates through the membrane from the high pressure side to the low pressure side of the membrane, and
   c. removing the permeated gas from the low pressure side of the membrane.

8. A process of separating a gas mixture comprising the steps of:
   a. using a membrane fabricated from a polymer selected from the group consisting of polysulfone, polyethersulfone, polystyrene, polycarbonate, ethyl cellulose, styreneacrylonitrile copolymer, ABS, and poly(4-vinylanisole-4-vinylpyridine), in which the membrane is first formed by extruding, molding, or casting said polymer followed by surface treating the formed membrane by exposure to gaseous fluorine or a combination of gaseous fluorine and sulfur dioxide under conditions such that at least 10 percent of the hydrogen groups at only the membrane surface are replaced by fluorine, thereby minimizing the treatment depth at the membrane surface and resulting in an increase in the selectivity of the treated over the untreated membrane of at least about 10 percent with a minimal decrease in permeability of the treated over the untreated membrane, and contacting the treated side of the membrane with a feed gas mixture under pressure, b. maintaining a pressure differential across the membrane such that a portion of the feed gas mixture permeates through the membrane from the high pressure side to the low pressure side of the membrane, and c. removing the permeated gas from the low pressure side of the membrane.

* * * * *